US009596259B2

United States Patent
Handel et al.

(10) Patent No.: US 9,596,259 B2
(45) Date of Patent: *Mar. 14, 2017

(54) METHOD FOR COMBINING MULTIPLE SIGNAL VALUES IN THE DENDRITIC CELL ALGORITHM

(71) Applicant: The Boeing Company, Huntington Beach, CA (US)

(72) Inventors: Mark Jonathan Handel, Seattle, WA (US); Douglas Alan Stuart, St. Charles, MO (US); Hugh L Taylor, Mukilteo, WA (US); Steve A. Dorris, Saint Peters, MO (US); Brett Michael Wilson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/533,529

(22) Filed: Nov. 5, 2014

(65) Prior Publication Data

US 2016/0127387 A1    May 5, 2016

(51) Int. Cl.
  *G08B 23/00* (2006.01)
  *H04L 29/06* (2006.01)
  *G06F 21/56* (2013.01)

(52) U.S. Cl.
  CPC ............ *H04L 63/145* (2013.01); *G06F 21/56* (2013.01); *G06F 2221/034* (2013.01)

(58) Field of Classification Search
  None
  See application file for complete search history.

(56) References Cited

U.S. PATENT DOCUMENTS

2012/0130929 A1* 5/2012 Cantin ................... G06N 3/126
706/13

OTHER PUBLICATIONS

Ou et al., Multiagent-Based Dendritic Cell Algorithm with Applications in Computer Security, Apr. 2011, 466-475.*
Greensmith, Julie, et al, Articulation and Clarification of the Dendritic Cell Algorithm; Lecture Notes in Computer Science vol. 4163, pp. 404-417 , UK Jan. 1, 2006.
Greensmith, Julie, et al, Dendritic Cells for SYN Scan Detection; Proceedings of the Genetic and Evolutionary Computation Conference (GECCO 2007) Jan. 1, 2007, pp. 49-56.
(Continued)

*Primary Examiner* — Brandon Hoffman
(74) *Attorney, Agent, or Firm* — Parsons Behle & Latimer

(57) ABSTRACT

Artificial Immune Systems (AIS) including the Dendritic Cell Algorithm (DCA) are an emerging method to detect malware in computer systems. A DCA module may receive an output or signal from multiple indicators concerning the state of at least a portion of the system. The DCA module is configured to combine the plurality of signals into a single signal vector. The DCA module may be configured to sort the received signals based on signal type and magnitude of each signal. The DCA module may then use a decay factor to weight the received signals so that a large number of "nominal" signals do not drown out a small number of "strong" signals indicating a malware attack. The decay factor may be exponentially increased each time it is applied so that all received signals are considered by the DCA module, but so that the "nominal" signals may have a minimal effect.

16 Claims, 3 Drawing Sheets

(56) References Cited

OTHER PUBLICATIONS

Al-Hammadi, Yousof, DCA for Bot Detection; Proceedings of the IEEE World Congress on Computational Intelligence (WCCI2008), Hong King, p. 1807-1816, Jan. 1, 2008.

Gu, Feng, et al, Exploration of the Dendritic Cell Algorithm Using the Duration Calculus; Proceedings of 8th International Conference on Artificial Immune Systems (ICARIS 2009), Lecture Notes in Computer Science 5666, York, UK, pp. 1-13, Jan. 1, 2001.

Gu, Feng, et al, Quiet in Class: Classification, Noise and the Dendritic Cell Algorithm; Proceedings of the 10th International Conference on Artificial Immune Systems (ICARIS 2011), LNCS vol. 6825, pp. 173-186, Cambridge, UK Jan. 1, 2011.

Greensmith, Julie, The Deterministic Dendritic Cell Algorithm; Lecture Notes in Computer Science vol. 5132, pp. 291-302, Phuket, Thailand Aug. 10, 2008.

Greensmith, Julie, et al, Introducing Dendritic Cells as a Novel Immune-Inspired Algorithm for Anomaly Detection; 4th International Conference, ICARIS 2005, pp. 153-167, Banff, Alberta, Canada Aug. 14, 2005.

Gu, Feng, et al, Integrating Real-Time Analysis With the Dendritic Cell Algorithm Through Segmentation ; In Genetic and Evolutionary Computation Conference (GECCO 09), Montreal Quebec, Canada Jul. 8, 2009.

\* cited by examiner

METHOD FOR COMBINING MULTIPLE SIGNAL VALUES IN THE DENDRITIC CELL ALGORITHM

CROSS-REFERENCE TO RELATED APPLICATIONS

This application is related to U.S. patent application Ser. No. 14/333,875 entitled "Dendritic Cell Algorithm Module with Inflammatory Inter-Node Signaling" filed on Jul. 17, 2014 now published as U.S. patent app. pub. no. 2016/0021120, U.S. patent application Ser. No. 14/334,037 entitled "Process Level Locality and Specialization for Threat Detection in the Dendritic Cell Algorithm" filed on Jul. 17, 2014 now published as U.S. patent app. pub. no. 2016/0021125, and U.S. patent application Ser. No. 14/502,684 entitled "Dynamic Loading and Configuration of Threat Detectors Based on Feedback From Other Nodes" filed on Sep. 30, 2014 now published as U.S. patent app. pub. no. 2016/0094580, each of which is incorporated by reference in its entirety herein.

BACKGROUND

Field of the Disclosure

The embodiments described herein relate to a method and system of a Dendritic Cell Algorithm module using the Dendritic Cell Algorithm to detect malware in computer systems.

Description of the Related Art

Malware (viruses, trojans, "advanced persistent threats," etc.) represents a significant potential risk in embedded network systems, such as, for example, computer networks in factory control systems. Safeguarding the integrity of a given network is often an important task for ensuring the overall safety of critical systems. As a result, detection of viruses and malware is an increasingly critical task in embedded systems.

Unfortunately, recent trends demonstrate that malware creators are willing to dedicate significant time and resources to the dissemination of malware, and the malware can often be cloaked and hidden in sophisticated ways. Further, continual development of malware requires users to continually take action to update additional malware protection in an effort to protect their devices and/or systems. Usefully, viruses and hosts have been waging an on-going war in the biological domain for many millennia. The outcome of the biological war has been a remarkably sophisticated and subtle system that can quickly detect, attack, and kill harmful invaders, while managing to avoid not only damage to the self, but also not killing other symbiotic organisms in the body.

Artificial immune systems (AIS) are a collection of algorithms developed from models or abstractions of the function of the cells of the human immune system. One category of AIS is based on the Danger Theory, and includes the Dendritic Cell Algorithm (DCA), which is based on the behavior of Dendritic Cells (DCs) within the human immune system. DCs have the power to suppress or activate the immune system through the correlation of signals from an environment, combined with location markers in the form of antigen. The function of a DC is to instruct the immune system to act when the body is under attack, policing the tissue for potential sources of damage. DCs are natural anomaly detectors, they are the sentinel cells of the immune system. The DCA has demonstrated potential as a static classifier for a machine learning data set and anomaly detector for real-time port scan detection.

The DCA has been described in a number of references, including Greensmith, Aickelin and Twycross, *Articulation and Clarification of the Dendritic Cell Algorithm*. In Proc. of the 5th International Conference on Artificial Immune Systems, LNCS 4163, 2006, pp. 404-417. The following features of the DCA differentiate the algorithm from other AIS algorithms: (1) multiple signals are combined and are a representation of environment or context information; (2) signals are combined with antigen in a temporal and distributed manner; (3) pattern matching is not used to perform detection, unlike negative selection; and (4) cells of the innate immune system are used as inspiration, not the adaptive immune cells, and unlike clonal selection, no dynamic learning is attempted.

As described in the DCA literature, DCs can perform various functions, depending on their state of maturation. Modulation between these maturation states is facilitated by the detection of signals within the tissue, namely: (1) danger signals, (2) pathogenic associated molecular patterns (PAMPs), (3) apoptotic signals (safe signals), and (4) inflammatory cytokines. The DCA has been implemented successfully in various localized applications, which have made use of danger signals, PAMPs, and safe signals. Existing DCA implementations have used only a single signal vector as an indication of the state of the environment. The single signal vector is made up of a vector of four floating point values, representing PAMP, danger, safe and inflammation.

In an actual implementation of the DCA it may be necessary to have multiple indicators, each of which describes one feature of the environment. For instance, in an embedded network, indicators that indicate the status of various aspects, such as overall bandwidth utilization, recent network traffic endpoints, and time since last heartbeat event, may all contribute to the state of the environment. The DCA's performance, with respect to true and false positives, is often improved by adding additional indicators to be considered by the DCA. This mimics the behavior of the human immune system, where the dendritic cell has upwards of fifteen to twenty different indicators, called Toll-Like Receptors (TLRs), each one evolved to detect a specific feature or a small set of features. (e.g. one TLR has evolved to target features only found on the tuberculosis bacterium).

Present applications of the DCA typically consider only one or two outputs of feature indicators. There has been very little development on combining feature indicators together to analyze the status of the environment or system. Instead, the DCA may use a mean of all the indicator outputs. As a result, one very "strong" indicator output, also referred to herein as a "strong" signal or even multiple "strong" indicator outputs may be drowned out by a large number of "nominal" indicator outputs, also referred to herein as "nominal" signals.

SUMMARY

The present disclosure is directed to a method and system that combines and weights multiple signal values that overcomes some of the problems and disadvantages discussed above.

In one example, a system for the determination of a state of at least a portion of the system comprises a DCA module and a plurality of indicators, wherein each indicator generates a signal vector that indicates a state of an environment of the indicator. The DCA module receives the signal vectors from the plurality of indicators and combines the signal vectors to a combined single signal vector.

The DCA module may use the DCA to analyze the combined single signal vector to determine a state of at least a portion of the system. Each signal vector may comprise a vector comprised of at least four floating point values. The four floating point values may correspond to a PAMP signal, a danger signal, a safe signal, and an inflammatory signal. The DCA module may sort the signal vectors from the plurality of indicators by the four floating point values. Each of the four floating point values may have an upper bound. The DCA module may weight each signal vector sorted by the four floating point values. The DCA module may further sort the signal vectors from largest to smallest. The DCA module may apply a different decay factor to each signal vector, the decay factor applied increases as applied from the largest signal to the smallest signal to weight each signal vector. Combining the signal vectors to the combined single signal vector may comprise adding together the weighted signal vectors.

In another example, a method is disclosed for combining multiple signal values in a DCA. The method comprises receiving multiple signal vectors from a plurality of indicators, wherein the signals are received at a DCA module. The method comprises combining the multiple signal vectors into a single resultant vector. The multiple signal vectors may each be comprised of at least four floating point values. The four floating point values may correspond to a PAMP signal, a danger signal, a safe signal, and an inflammatory signal. The method may comprise sorting the received signal vectors into four groupings grouped by the four floating point values. The method may comprise weighting the sorted received signal vectors. The method may comprise using a decay factor to weight the sorted received signal vectors. The smallest decay factor may be assigned to a largest value for each group. The method may comprise increasing the decay factor assigned to each floating point value as the value decreases within each group. The decay factor may be exponentially increased as it is applied to each floating point value within each group.

Figure 1:
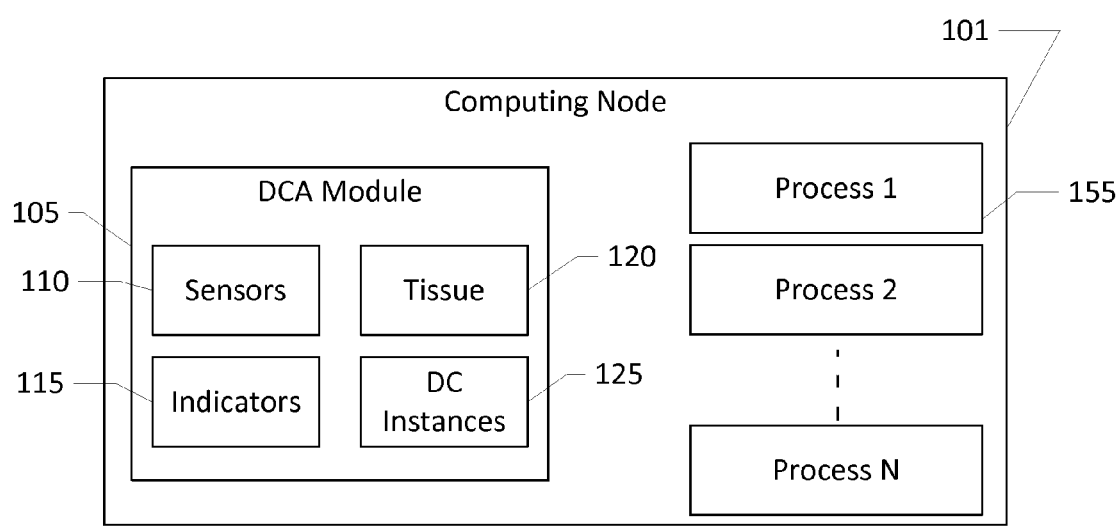
FIG. 1 is a block diagram illustrating one example of a computing node comprising a DCA module.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

The present application discloses an implementation of the DCA that may make use of all four signals, namely: (1) danger signals, (2) pathogenic associated molecular patterns (PAMPs), (3) apoptotic signals (safe signals), and (4) inflammatory cytokines. The signals are from a plurality of indicators of the DCA module. As used herein, the term "computing device" may refer to any device that includes a processor that is adapted to run one or more processes. As used herein, the term "network" may refer to a system with a plurality of discrete computing devices, a plurality of logical nodes within a single computing device (e.g., a plurality of virtual machines, individual computing processes, etc.), and/or a combination of discrete computing devices and logical nodes.

In some cases, as described below, each individual node within a network runs an instantiation of the DCA, which computes "signals" from the local node based on the node's current condition, and regularly determines the potential for a particular "antigen" to be harmful, based on pre-determined criteria. The nodes are linked together through a network or other channels of communication. When an anomaly is detected by the DCA module of one node, the module propagates signals to other nodes on the network. This approach helps to put other nodes on alert. The DCA module is alerted by signals received from the indicators of the DCA module. However, a large number of "nominal" signals from the indicators indicating that there is no threat may drown out a "strong" signal indicating a harmful process causing the DCA module to ignore the "strong" signal.

Prior DCA implementations have used only a very small number of signal vectors as an indication of the state of the environment. The single signal vector is made up of a vector of four floating point values, representing PAMP, danger, safe and inflammation. One potential problem with this approach is that a "strong" signal received by a DCA module may be drowned out by a large number of "nominal" signals also received by the DCA module. For example, a DCA module may receive a single "strong" signal indicating a possible attack or adverse state from an indicator. The DCA module may also receive a large number of "nominal" signals from other indicators that are not under attack or in an adverse state. When taken together, the large number of "nominal" signals may cause the DCA module to ignore, or at the very least minimize, the received "strong" signal, especially if the DCA module averages or takes the median of the received signals from the indicators. Thus, the DCA module of the present disclosure may apply a method to sort the received signals by type and then sort the received signals by type into a list in descending order. The DCA module of the present disclosure may apply a method that weighs the received signals in correlation with the value or magnitude of the signal. In this way, the DCA module may adequately take into account the "strongest" signals with "nominal" signals also being considered, but being weighted to decrease their significance.

The DCA module may be programmed to sort all received signals into a list for each signal type. For example, the DCA module may create four separate lists for received PAMP, danger, safe, and inflammation signals. The DCA module may then sort each list into descending order based on the value or magnitude of the received signals. Using the lists sorted into descending order, the DCA module may then weight the values for each value in the sorted list. The DCA may apply a decay factor that increases exponentially for each value within each list. In this manner, a large number of "nominal" values will still be considered in determining a perceived threat by the DCA module, but the significance of the "nominal" values may be minimized so that a small number of "strong" signals are not ignored or drowned out by the large number of "nominal" values.

FIG. 1 is a block diagram illustrating one example of a computing node 101 comprising a DCA module 105. In some cases, the computing node 101 may comprise a discrete computing device (e.g., desktop computer, notebook computer, etc.), which may communicate with similar computing devices in a network. In other cases, the computing node 101 may comprise a logical "node" (e.g., virtual machine, computing process, etc.), which may operate in parallel with similar logical nodes within a single computing device. Therefore, as described herein, a network of computing nodes may comprise a collection of discrete computing devices, a collection of logical nodes within a single computing device, and/or a combination of the two.

In the illustrated example, the computing node 101 comprises a plurality of processes 155 (labeled Process 1 through Process N in FIG. 2) operating in parallel with the DCA module 105 within the computing node 101. In addition, the DCA module 105 comprises a plurality of sensors 110, indicators 115, a tissue module 120, and a plurality of individual dendritic cell (DC) instances 125. As discussed above, the DCA module 105 may be programmed to sort the received signals from indicators 115 by indicator type into a list in descending order based on value of the signal.

Figure 2:
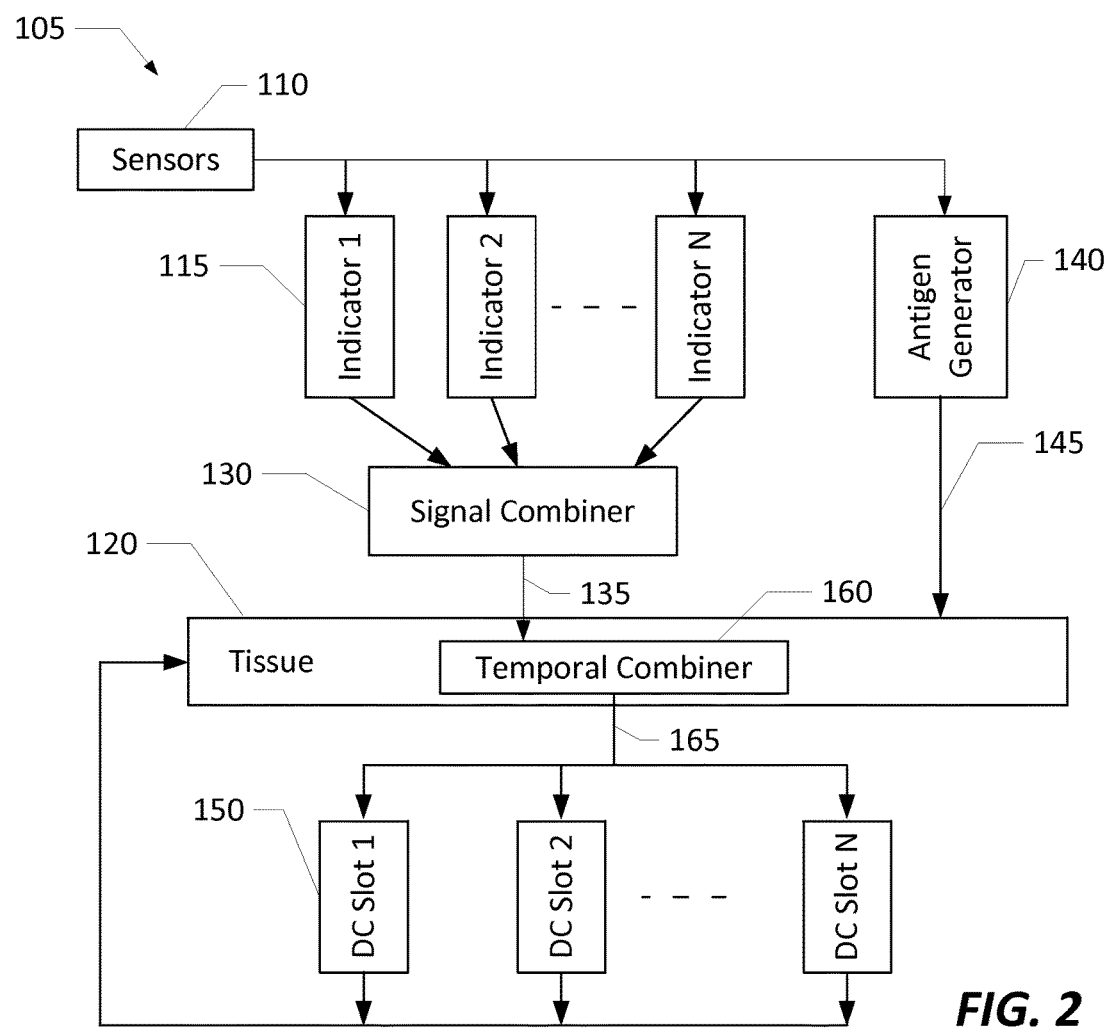
FIG. 2 is a block diagram illustrating one example of a DCA module.

FIG. 2 is a block diagram illustrating one example of a DCA module 105. In the example illustrated in FIG. 2, the DCA module 105 comprises a plurality of sensors 110, which measure raw sensor data, such as, for example, computer network information (e.g., packet data, etc.) and/or process information (e.g., processor time, memory usage, page faults, etc.). As shown in FIG. 2, the raw sensor data can be used by a selected number of DCA indicators 115 (labeled Indicator 1 through Indicator N in FIG. 2) to generate signals, which may represent a wide variety of parameters. For example, in some cases, Indicator 1 may generate a heartbeat or "keep alive" signal, Indicator 2 may generate a processor load signal or a packet size signal, and Indicator N may generate a signal representing a sender's network address. Other examples of suitable indicators 115 may include signals indicative of parameters such as bandwidth, processor memory utilization, processor load, etc.

As shown in FIG. 2, the signals generated by indicators 115 are combined by a signal combiner 130, which may perform a variety of suitable combination functions. For example, in some cases, the signal combiner 130 may sum signals from the indicators 115, whereas in other cases, the signal combiner 130 may average the signals from indicators 115. As yet another example, the signal combiner 130 may determine the median value of the signals from the indicators 115. However, determining the simple median value of the signals from the indicators 115 may result in a "strong" signal being minimized if the signal combiner 130 also receives a large amount of "nominal" signals. Thus, the signal combiner 130 may sort the received signals into lists based on signal types and may apply a weight to the values based on the descending order of the value or magnitude of the signals in the list for each indicator type.

Using a suitable combination function, the signal combiner 130 creates an aggregated indicator signal 135, which is provided as an input to the tissue module 120. In addition, the raw sensor data is used by an antigen generator 140 to create an antigen 145, which is also provided as an input to the tissue module 120.

An aggregated signal 135 and antigen 145 are created for each individual raw sensor "event." For example, in the case of network traffic, a raw sensor event may comprise a packet, whereas in the case of processor load, a raw sensor event may comprise a selected time period (e.g., 0.1 seconds, etc.). The tissue module 120, in turn, includes a temporal combiner 160, which combines an array of one or more aggregated indicator signals 135 received over time, to generate a "DC-Seen" signal 165. In some cases, the temporal combiner 160 may average the aggregated indicator signals 135, whereas in other cases, the temporal combiner 160 may determine the maximum or median of the aggregated indicator signals 135. The temporal combiner 160 includes a "look back" period, which may correspond to a selected time period (e.g., 3 seconds) or a number of events.

In operation, the tissue module 120 manages the indicator signal 135 and the antigen 145, and provides the DC-Seen signal 165 to a plurality of individual DC instances 125 located in a plurality of DC slots 150 (labeled DC Slot 1 through DC Slot N in FIG. 2). As the individual DC instances 125 age out, they present the resulting data back to the tissue module 120, which aggregates the data across the plurality of individual DC instances 125.

Figure 3:
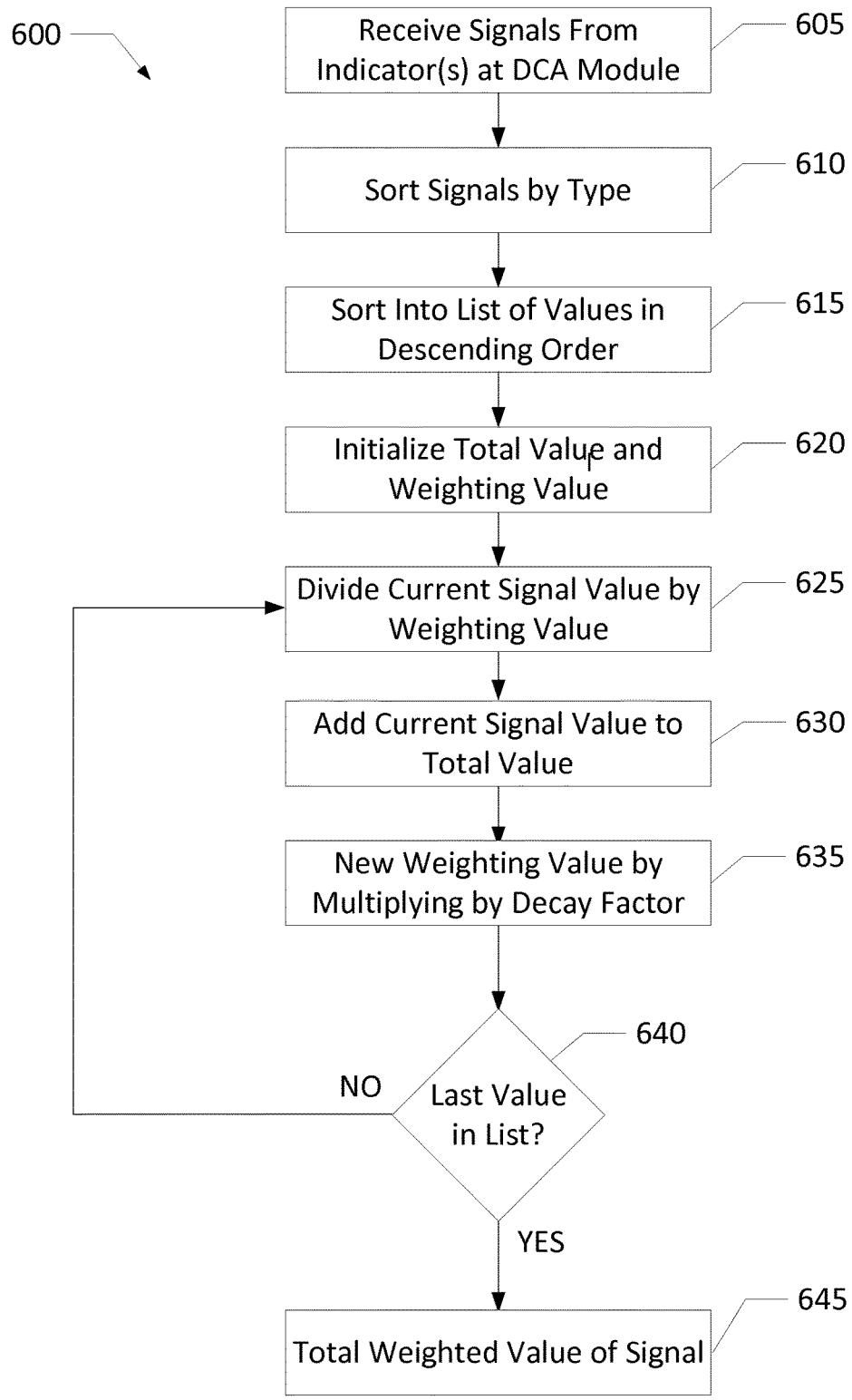
FIG. 3 is a flow chart showing one example of a method of weighting signal values by a DCA module.

FIG. 3 shows a flow chart of a method 600 for combining multiple signal value in a DCA. A DCA module may use the method to combine multiple signal values. At step 605, the DCA module receives a plurality of signals from a plurality of indicators. The DCA module sorts the signals by type at step 610. For example, the DCA module may sort the signals into separate lists for PAMP, danger, safe and inflammation. In step 615, the DCA module then sorts each list into descending order based on the value or magnitude of the signals in each list. The DCA module may then initialize a total value for each type of signal to zero and initialize a weighting value for each type of signal to an initial value, in step 620. The initial weighting value may be set to one (1.0). In step 625, the DCA module will then take the current signal value, which for the first time through the method will be the value of the signal having the greatest value, and divide the current value by the weighting value, which has been initialized to one (1.0). Dividing by one will yield the current value as the first, or greatest, value in the list. In step 630, the current value is added to the total value, which was previously initialized to zero. Thus, after step 630 the total value will simply be the first, or greatest, value in the specified list. The weighing factor will then be multiplied by a decay factor in step 635. The decay factor may be various numbers, but as an example the decay fact may be two (2.0). Thus, the weighting value becomes two (2.0) after the first time through steps 625-635.

After adding the current value to the total value in step 630 and determining a new weighting value in step 635, step 640 determines whether the specified list contains any more values. If so, steps 625, 630, and 635 are repeated for the second value in the list, which is the second greatest value because the list has been previously sorted into descending order. The second largest value is divided by two (the current weighting value) at step 625 and the resultant number is added to the total value in step 630. In step 635, the weighting factor, currently at two (2.0), will be multiplied by the decay factor to increase the weighting factor. If the decay factor is two (2.0), as discussed above, the weighting factor now becomes four (4.0).

After adding the current value to the total value in step 630 and determining a new weighting value in step 635, step 640 determines whether the specified list contains any more values. If so, steps 625, 630, and 635 are repeated for the next value in the list, which will be the third largest value as the list has been previously sorted in descending order. The third largest value is divided by four (4.0), the current weighting value, at step 625 and the resultant number is added to the total value in step 630. In step 635, the weighting factor, currently at four (4.0), will be multiplied by the decay factor to increase the weighting factor. If the decay factor is two (2.0), as discussed above, the weighting factor now becomes eight (8.0). This process is repeated until all values in the list of descending values have been weighted and added to the total value. This process will also be repeated for each individual list previously sorted into signal type by the DCA module. As will be appreciated by one of ordinary skill in the art having the benefit of this disclosure, the method of FIG. 3 provides that each received signal is considered by the DCA module, but that a large number of "nominal" signals will have a minimal effect on one or a few "strong" signals also received by the DCA module.

The DCA module 105 associated with any node 101 within a network may be in communication with other DCA modules 105 within a network. When such a harmful antigen is identified by indicators 115 for a particular node 101, the corresponding DCA module 105 may combine the signals by type and sort them into descending order. The DCA module 105 may then weight the signal. This combined signal may then be transmitted to other nodes 101 having corresponding DCA modules 105 within the network.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system for determining a state of at least a portion of the system comprising:
    a dendritic cell algorithm (DCA) module; and
    a plurality of indicators, wherein each indicator generates a signal vector that indicates a state of an environment of the indicator;
    wherein the DCA module receives the signal vectors from the plurality of indicators and combines the signal vectors to a combined single signal vector,
    wherein the DCA module uses a DCA to analyze the combined single signal vector to determine a state of at least a portion of the system,
    wherein each signal vector comprises a vector comprised of at least four floating point values.

2. The system of claim 1, wherein the four floating point values correspond to a pathogenic associated molecular patterns (PAMP) signal, a danger signal, a safe signal, and an inflammatory signal.

3. The system of claim 2, wherein the DCA module sorts the signal vectors from the plurality of indicators by the four floating point values.

4. The system of claim 3, wherein each of the four floating point values has an upper bound.

5. The system of claim 4, wherein the DCA module weights each signal vector sorted by the four floating point values.

6. The system of claim 5, wherein the DCA module further sorts the signal vectors from largest to smallest.

7. The system of claim 6, wherein the DCA module applies a different decay factor to each signal vector, the decay factor applied increases as applied from the largest signal to the smallest signal to weight each signal vector.

8. The system of claim 7, wherein combing the signal vectors to the combined single signal vector further comprises adding together the weighted signal vectors.

9. A method combining multiple signal values in a dendritic cell algorithm comprising:
    receiving multiple signal vectors from a plurality of indicators, wherein the signals are received at a dendritic cell algorithm (DCA) module; and
    combining the multiple signal vectors into a signal resultant vector, wherein the multiple signal vectors each are comprised of at least four floating point values.

10. The method of claim 9, wherein the four floating point values correspond to a pathogenic associated molecular patterns (PAMP) signal, a danger signal, a safe signal, and an inflammatory signal.

11. The method of claim 10, further comprising sorting the received signal vectors into four groupings grouped by the four floating point values.

12. The method of claim 11, further comprising weighting the sorted received signal vectors.

13. The method of claim 12, further comprising using a decay factor to weight the sorted received signal vectors.

14. The method of claim 13, wherein a smallest decay factor is assigned to a largest value for each group.

15. The method of claim 14, further comprising increasing the decay factor assigned to each floating point value as the value decreases within each group.

16. The method of claim 15, wherein the decay factor is exponentially increased as it is applied to each floating point value within each group.

* * * * *